US007132874B2

(12) United States Patent
McCorquodale et al.

(10) Patent No.: US 7,132,874 B2
(45) Date of Patent: Nov. 7, 2006

(54) LINEARIZING APPARATUS AND METHOD

(75) Inventors: Michael S. McCorquodale, Detroit, MI (US); Richard B. Brown, Salt Lake City, UT (US); Mei Kim Ding, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 218 days.

(21) Appl. No.: 10/829,575

(22) Filed: Apr. 22, 2004

(65) Prior Publication Data

US 2004/0222838 A1 Nov. 11, 2004

Related U.S. Application Data

(60) Provisional application No. 60/555,193, filed on Mar. 22, 2004, provisional application No. 60/464,760, filed on Apr. 23, 2003.

(51) Int. Cl.
*G06F 7/556* (2006.01)

(52) U.S. Cl. ...................................... 327/347; 327/543

(58) Field of Classification Search ................ 327/347, 327/350, 352
See application file for complete search history.

(56) References Cited

U.S. PATENT DOCUMENTS

| | | | | |
|---|---|---|---|---|
| 3,562,552 | A * | 2/1971 | Baudino et al. | 327/349 |
| 3,712,977 | A * | 1/1973 | Rice | 708/843 |
| 4,507,577 | A | 3/1985 | Kwan | |
| 4,564,815 | A | 1/1986 | Naito | |
| 4,712,010 | A * | 12/1987 | Alm | 250/334 |
| 5,473,279 | A * | 12/1995 | D'Angelo et al. | 327/347 |
| 5,523,875 | A * | 6/1996 | Morris | 398/209 |
| 5,796,842 | A * | 8/1998 | Hanna | 381/4 |
| 5,834,967 | A * | 11/1998 | Kuroda et al. | 327/543 |
| 6,118,879 | A * | 9/2000 | Hanna | 381/106 |
| 6,285,263 | B1 | 9/2001 | Anderson | |
| 6,429,720 | B1 * | 8/2002 | Gilbert | 327/348 |
| 6,549,057 | B1 * | 4/2003 | Gilbert | 327/349 |

(Continued)

FOREIGN PATENT DOCUMENTS

EP 0 415 649 A2 3/1991

(Continued)

OTHER PUBLICATIONS

McCorquodale, Michael S., et al., A CMOS Voltage-to-Frequency Linearizing Preprocessor for Parallel Plate RF MEMS Varactors, IEEE MTT-S Digest, Jun. 2003, ppp. A21-A24.

(Continued)

*Primary Examiner*—Long Nguyen
*Assistant Examiner*—Ryan Jager
(74) *Attorney, Agent, or Firm*—Brooks Kushman P.C.

(57) ABSTRACT

An apparatus and method are disclosed which provide a substantially linear relationship between an input signal, such as an input voltage or current, and a predetermined parameter, such as a frequency response or capacitance of a parallel plate capacitor or varactor. The apparatus comprises a square root converter and a logarithmic generator. The square root converter is adapted to provide a square root signal which is substantially proportional to a square root of the input signal. In the various embodiments, the logarithmic generator is adapted to provide an applied signal which is substantially proportional to a sum of a logarithm of the input signal plus the square root of the input signal. The applied signal is a pre-distorted signal which generally has a non-linear relation to the predetermined parameter and which, when applied, allows the predetermined parameter to vary substantially linearly with the input signal.

31 Claims, 6 Drawing Sheets

U.S. PATENT DOCUMENTS

| | | | | |
|---|---|---|---|---|
| 6,775,002 | B1 * | 8/2004 | Nawracala | 356/440 |
| 6,798,278 | B1 * | 9/2004 | Ueda | 327/541 |
| 2004/0013348 | A1 * | 1/2004 | Dickson | 385/18 |
| 2004/0263241 | A1 * | 12/2004 | Fujikura et al. | 327/543 |
| 2006/0012435 | A1 * | 1/2006 | Takahashi et al. | 330/285 |
| 2006/0091940 | A1 * | 5/2006 | Kimura | 327/543 |

FOREIGN PATENT DOCUMENTS

| | | |
|---|---|---|
| JP | 02141118 | 5/1990 |

OTHER PUBLICATIONS

Rebeiz, Gabriel M., et al., RF MEMS Switches and Switch Circuits, IEEE Microwave Magazine, vol. 2, Issue 4, Dec. 2001, pp. 59-71.

Nguyen, C.-T., High-Q Micromechanical Oscillators and Filters for Communications, IEEE International Symposium on Circuits and Systems, Hong Kong, Jun. 9-12, pp. 2825-2828.

Young, Darrin J., et al., A Micromachined-Based RF Low-Noise Voltage-Controlled Oscillator, IEEE Custom Integrated Circuits Conference, 1997, pp. 431-434.

Young, Darrin J., et al., Monolithic High-Performance Three-Dimensional Coil Inductors for Wireless Communication Applications, International Electron Devices Meeting, 1997, pp. 3.5.1-3.5.4.

Zou, Jun, et al., Development of a Wide Tuning Range MEMS Tunable Capacitor for Wireless Communication Systems, International Electron Devices Meeting, 2000, pp. 403-406.

Vittoz, Eric, et al., CMOS Analog Integrated Circuits Based on Weak Inversion Operation, IEEE Journal of Solid-State Circuits, vol. SC-12, No. 3, Jun. 1977, pp. 224-231.

Filanovsky I.M., et al., Simple CMOS Analog Square-Rooting and Squaring Circuits, IEEE Trans on Circuits and Systems I: Fundamental Theory and Applications, vol. 39, No. 4, Apr. 1992.

Gregorian R., et al., Analog MOS Integrated Circuits for Signal Processing, New York: John Wiley & Sons, 1986, pp. 450.

* cited by examiner

LINEARIZING APPARATUS AND METHOD

CROSS-REFERENCE TO RELATED APPLICATIONS

This application is related to Michael S. McCorquodale et al., U.S. Provisional Patent Application Ser. No. 60/464,760, entitled "A CMOS Voltage-to-Frequency Linearizing Circuit for Parallel Plate RF MEMS Varactors," filed Apr. 23, 2003, incorporated by reference herein, with priority claimed for all commonly disclosed subject matter (the "first related application").

This application is related to Michael S. McCorquodale, U.S. Provisional Patent Application Ser. No. 60/555,193, entitled "Monolithic and Top Down Clock Synthesis with Micromachined Radio Frequency Reference," filed Mar. 22, 2004, incorporated by reference herein, with priority claimed for all commonly disclosed subject matter (the "second related application").

BACKGROUND OF THE INVENTION

1. Field of the Invention

The present invention is related generally to linearizing apparatuses and methods, and more specifically, to apparatuses and methods which provide a linear relationship between an input signal, such as an input voltage, and a selected or predetermined circuit parameter, such as a frequency response or capacitance.

2. Background Art

The following references are noted herein:

[1] G. M. Rebeiz and J. B. Muldavin, "RF MEMS Switches and Switch Circuits," IEEE Microwave Magazine, vol. 2, issue 4, pp. 59–71, December 2001.

[2] C. T.-C. Nguyen, "High-Q Micromechanical Oscillators and Filters for Communications (invited)," IEEE International Symposium on Circuits and Systems, Hong Kong, Jun. 9–12, 1997, pp. 2825–2828.

[3] D. Young and B. Boser, "A Micromachined-Based RF Low-Noise Voltage-Controlled Oscillator," IEEE Custom Integrated Circuits Conference, pp. 431–434, 1997.

[4] D. Young et al., "Monolithic High-Performance Three-Dimensional Coil Inductors for Wireless Communication Applications," International Electron Devices Meeting, pp. 3.5.1–3.5.4, 1997.

[5] J. Zou et al., "Development of a Wide Tuning Range MEMS Tunable Capacitor for Wireless Communication Systems," International Electron Devices Meeting, pp. 403–406, 2000.

[6] H. Ainspan and J.-O. Plouchart, "A Comparison of MOS Varactors in Fully-Integrated CMOS LC VCO's at 5 and 7 GHz," European Solid-State Circuits Conference, 2000.

[7] E. Vittoz and J. Fellrath, "CMOS Analog Integrated Circuits Based on Weak Inversion Operation," IEEE Journal of Solid-State Circuits, vol. SC-12, no. 3, pp. 224–231, June 1977.

[8] I. M. Filanovsky and H. P. Baltes, "Simple CMOS Analog Square-Rooting and Squaring Circuits," IEEE Trans. on Circuits and Systems I: Fundamental Theory and Applications, vol. 39, no. 4, April 1992.

[9] R. Gregorian and G. C. Temes, "Analog MOS Integrated Circuits for Signal Processing," New York: John Wiley & Sons, 1986.

Microelectromechanical systems ("MEMS") technology has been demonstrated successfully in a variety of RF applications including switching [1], filtering [2], and frequency synthesis [2]. Components such as MEMS varactors [3] and inductors [4], when coupled, have been shown to provide a high quality factor (Q-factor) reference for voltage controlled oscillators ("VCOs") [3] when compared to alternative integrated technology. Several parallel plate varactor topologies have been reported with impressive results [3][5]. However, a significant drawback associated with the parallel plate topology is the highly nonlinear tuning or frequency response as a function of the electrostatic actuation of the device.

Other devices also exhibit nonlinear characteristics, such that a selected or predetermined device parameter has a nonlinear relationship to an input or control signal, such as an input voltage. In addition to MEMS varactors, the frequency response of parallel plate capacitors, more generally, has a nonlinear relationship to the voltage of the capacitor. Similarly, junction varactors and metal oxide semiconductor ("MOS") varactors also exhibit such nonlinear characteristics.

Tuning of such capacitors to a selected or predetermined frequency, as part of an oscillator, for example, as a nonlinear response, is comparatively difficult. In the prior art, the nonlinear frequency response is modeled, with particular voltage levels (as coefficients) specified for corresponding frequencies. The resulting modeled coefficients are stored as a look-up table in memory, which is subsequently accessed to tune a particular device to a selected frequency. Such an implementation, however, requires additional processing circuitry, a memory circuit, and memory interface circuitry. In addition, to the extent fabrication varies from assumed modeling parameters, such stored coefficients are inaccurate, and do not provide the desired result of tuning such a device to a selected frequency.

As a consequence, a need remains for a more robust and accurate solution for selecting or determining device parameters, such as for tuning a device to a particular frequency, when such parameters have a nonlinear relationship to corresponding input or control signals. Such a solution should be capable of being implemented using existing integrated circuit fabrication technology, without the additional need for memory and memory interface circuitry.

SUMMARY OF THE INVENTION

An apparatus embodiment of the present invention provides a substantially linear relationship between an input signal, such as an input voltage, and a selected parameter, such as a frequency response of an oscillator or capacitor. The various embodiments generate an applied signal which is effectively pre-distorted, such that when it is applied to such an oscillator or capacitor, it allows the selected parameter to vary substantially linearly with the input signal to, for example, tune an oscillator to a selected frequency.

The various embodiments of the present invention provide a robust and accurate method for selecting or modifying device parameters, such as varying a tuning frequency, which generally have a nonlinear relationship to corresponding input or control signals, such as an input voltage. The various embodiments of the present invention may be implemented using existing integrated circuit fabrication technology, such as existing CMOS technology, without the additional need for memory and memory interface circuitry of the prior art. The various embodiments also provide such linearization while comparatively minimizing power consumption.

In one of the exemplary embodiments, the apparatus comprises a square root converter and a logarithmic generator, and provides a substantially linear relationship between an input signal and a selected parameter. The square root converter is couplable to receive the input signal, and is adapted to provide or otherwise capable of providing a square root signal which is substantially proportional to a square root of the input signal. The logarithmic generator is also couplable to receive the input signal and coupled to the square root converter. The logarithmic generator generates a logarithmic signal which is substantially proportional to a logarithm of the input signal. The logarithmic generator 230 may also have a combining functionality, providing an applied signal which is substantially proportional to a sum of a logarithm of the input signal plus the square root signal. The logarithm of the input signal is provided by the logarithmic generator as substantially equivalent to a $\frac{3}{2}$ power of the input signal. The exemplary apparatus may further comprise an oscillator (150) coupled to receive the applied signal, wherein an oscillation frequency of the oscillator is the selected parameter and is substantially linearly tunable in response to the input signal.

The various embodiments may also include a voltage-to-current converter coupled to the square root converter and to the logarithmic generator. The voltage-to-current converter is couplable to receive an input voltage, and is adapted to provide the input signal, to the square root converter and to the logarithmic generator as an input current having a substantially linear relationship to the input voltage. A current mirror may also be utilized to provide the input current from the voltage-to-current converter to the square root converter and the logarithmic generator.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. ("Fig." or "FIG.") 1A and FIG. 1B are, respectively, a top view and a cross-sectional view illustrating a generalized parallel plate RF MEMS varactor.

DETAILED DESCRIPTION OF THE PREFERRED EMBODIMENTS

Figure 1A:
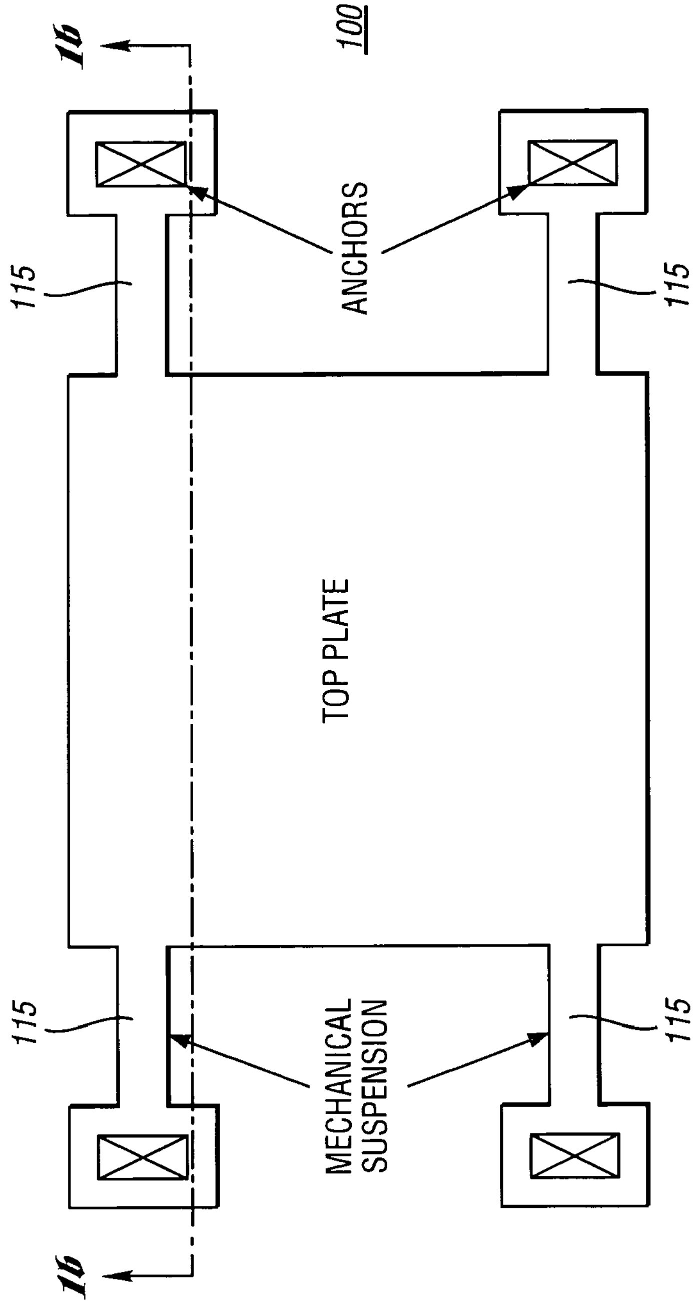

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, the various embodiments of the present invention provide for a robust and accurate solution for selecting or determining device parameters, such as frequency or capacitance responses, when such parameters have a nonlinear relationship to corresponding input or control signals, such as input voltages. The various embodiments of the present invention may be implemented using existing integrated circuit fabrication technology, such as existing CMOS technology, without the additional need for memory and memory interface circuitry.

The application of a parallel plate MEMS varactor in a typical CMOS LC oscillator is discussed below. The mechanical physics of the device are discussed, and the frequency tuning characteristic as a function of the tuning voltage are derived. A linearizing technique is described and a complete circuit for preprocessing the input tuning voltage, to create an applied voltage for tuning or for selection of other parameters, is demonstrated.

Figure 1B:

FIG. ("Fig." or "FIG.") 1A and FIG. 1B are, respectively, a top view and a cross-sectional view illustrating a generalized parallel plate RF MEMS varactor 100. The device 100 is constructed by mechanically suspending a metal top plate 105 in air above a fixed metal bottom plate 110. A mechanical suspension network 115 provides support for the top plate 105 as shown. The device presents a nominal capacitance set by the device geometry and the nominal gap between the plates, $x_o$. By applying a positive DC voltage, $V_{DC}$, across the plates, the moveable top plate 105 will deflect some distance, x, due to electrostatic force, and thus the capacitance is modulated.

Variations of this topology have been presented in previous work, and include modifications to the mechanical support network, the plate distances, and location of the actuation voltage [5]. Nevertheless, the fundamental parallel plate operation, as presented, remains the same in all of this work. As a consequence, the various embodiments of the present invention are applicable to a wide variety of devices, including parallel plate capacitors. In addition, the various embodiments of the present invention are applicable whenever a selected parameter, such as frequency or capacitance, has a nonlinear relationship to an input or control signal, such as an applied input voltage.

Figure 2:
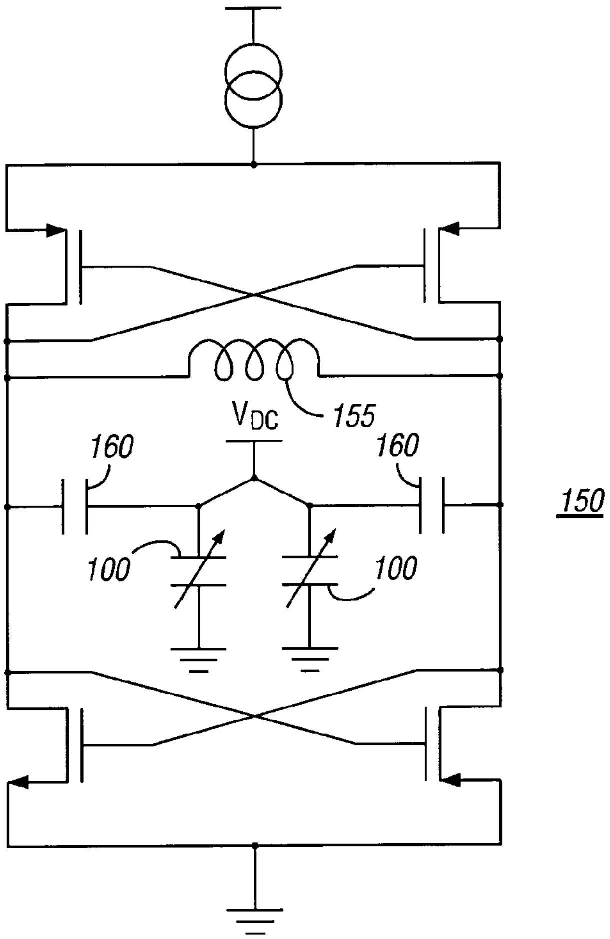
FIG. 2 is a circuit diagram illustrating a voltage controlled oscillator utilizing an RF MEMS varactor.

A typical application for an RF MEMS varactor 100 is as the tunable element in voltage-controlled-oscillator (VCO) 150 illustrated in FIG. 2. The varactor, when coupled with an inductor 155, forms an LC tank that provides a high Q-factor reference for frequency synthesis. A typical VCO implementation with a MEMS varactor would be with a cross-coupled negative resistance amplifier as shown in FIG. 2. The DC tuning voltage that is applied to the varactor top plate 105 should be isolated in some manner from the remainder of the circuit. This can be accomplished with the introduction of large bypass capacitors 160 as shown. Moreover, the tuning voltage should be sourced through a large resistance so as to eliminate an AC path to ground which would short circuit the varactor.

RF MEMS varactors are considered in VCO applications due to the achieveable Q-factor, which translates into improved phase noise by a quadratic factor. Previous work has reported Q-factors as high as 60 at 1 GHz [3]. This compares to typical MOS varactors that reach Q-factors of only 20 at comparable frequencies [6].

Figure 3:
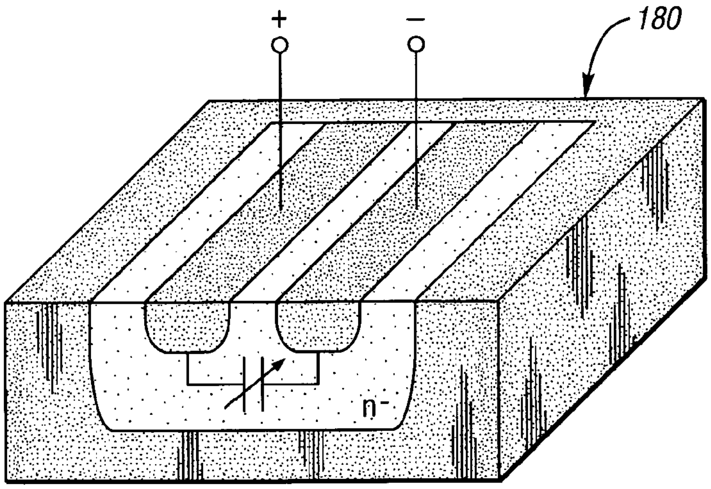
FIG. 3 is a perspective view of an integrated circuit implementation of a p-n junction varactor.

FIG. 3 is a perspective view of an integrated circuit implementation of a p-n junction varactor 180. It should be noted that while much of the derivation discussed below is with respect to parallel plate capacitors, similar considerations are applicable to junction varactors, such as p-n junction varactor 180. More particularly, the capacitance of a junction varactor varies nonlinearly with the input voltage (discussed in greater detail below). As a consequence, such capacitance, as a selected or predetermined parameter (comparable to frequency for the parallel plate capacitor), may be varied linearly with an input voltage which has been preprocessed in accordance with the present invention.

The fundamental resonant frequency for a generalized LC oscillator is given by (Equation 1):

$$\omega_0 = \frac{1}{\sqrt{LC}}$$

where L is the inductance, C is the capacitance of the tank, and $\omega_o$ is the fundamental radian frequency. When a MEMS varactor is employed to realize the capacitance, then this variable capacitance is described by the following relationship (Equation 2):

$$C = \frac{\varepsilon A}{x_0 - x}$$

where $\epsilon$ is the permittivity of air, A is the plate overlap area, $x_o$ is the nominal distance between the plates, and x is some displacement forced by the DC tuning voltage, $V_{DC}$, as shown in FIG. 1. The relationship between the varactor 100 capacitance and frequency is found by substitution of Equation 2 into Equation 1 (Equation 3):

$$\omega_0 = \sqrt{\frac{(x_0 - x)}{L\varepsilon A}}$$

The relationship between x and $\omega_0$ is clearly nonlinear. For the MEMS varactor, however, x is typically small as compared to $x_o$ (at most $x_o/3$) and much less than 1. Consider the binomial series of the function $f(x)=(1-x)^{1/2}$, which is of the same form as Equation 3 (Equation 4):

$$f(x) = 1 - \frac{x}{2} - \frac{x^2}{8} - \frac{x^3}{16} - \cdots$$

For small x and x much less than 1, the relationship is well approximated by the linear term. The correlation coefficient ($R^2$) of the least squares linear fit to the function is 0.9999 for x from 0 to $x_o/3$. The origin of the nonlinear frequency-voltage relationship in the device 100 physics is discussed below.

The electrostatic force, $F_e$, generated between the plates by the applied tuning voltage, $V_{DC}$, can be derived by considering the energy, E, stored between the plates (Equation 5):

$$F_e = \frac{\partial E}{\partial x} = \frac{1}{2}\frac{\partial C}{\partial x}V_{DC}^2 = \frac{1}{2}\frac{CV_{DC}^2}{(x_0 - x)}$$

The effective electrical spring constant, $k_e$, is given by the magnitude of the differential of this force with respect to displacement (Equation 6):

$$k_e = \left|\frac{\partial F_e}{\partial x}\right| = \frac{CV_{DC}^2}{(x_0 - x)^2} = \frac{\varepsilon A V_{DC}^2}{(x_0 - x)^3}$$

A mechanical spring constant, $k_m$, is associated with the top plate 105 suspension 115. A mechanical restoring force, $F_m$, is created by this suspension. The relationship between $k_m$ and $F_m$ is given by Hooke's Law (Equation 7):

$$F_m = k_m x$$

The magnitudes of $F_m$ and $F_e$ are equal at equilibrium as the electrostatic force is balanced by the mechanical restoring force of the suspension network (Equation 8):

$$k_m x = \frac{1}{2}\frac{CV_{DC}^2}{(x - x_0)} = \frac{1}{2}k_e(x_0 - x)$$

An expression for $k_e$ in terms of $k_m$ can then be written as (Equation 9):

$$k_e = \frac{2k_m x}{(x_0 - x)}$$

When $x=x_o/3$, the magnitude of each spring constant is equal. Beyond this point the electrical force exceeds the maximum mechanical restoring force and the plates are pulled together. Thus, the tuning voltage associated with a deflection of $x=x_o/3$ is called the pull-in voltage. Typically the device is operated at some reasonable point away from this pull-in voltage. As a consequence, the maximum theoretical tuning range of the varactor is 50%.

The mechanical spring constant $k_m$ is dependent on the spring suspension geometry only and it is of the following generalized form (Equation 10):

$$k_m = \beta\frac{E_y w_b t_b^3}{l_b^3}$$

where $E_y$ is Young's modulus of the material, $w_b$ is the width of the supporting beam, $t_b$ is the thickness, $l_b$ is the length, and $\beta$ is a dependent on the number and orientation of the supporting beams.

Finally the relationship between VDC and x can be expressed using Equations 6, 9, and 10 (Equation 11):

$$V_{DC}=\sqrt{\frac{2k_m x(x_0-x)^2}{\varepsilon A}}=\sqrt{\beta\frac{2E_y w_b t_b^3 x(x_0-x)^2}{l_b^3\varepsilon A}}$$

Figure 4:
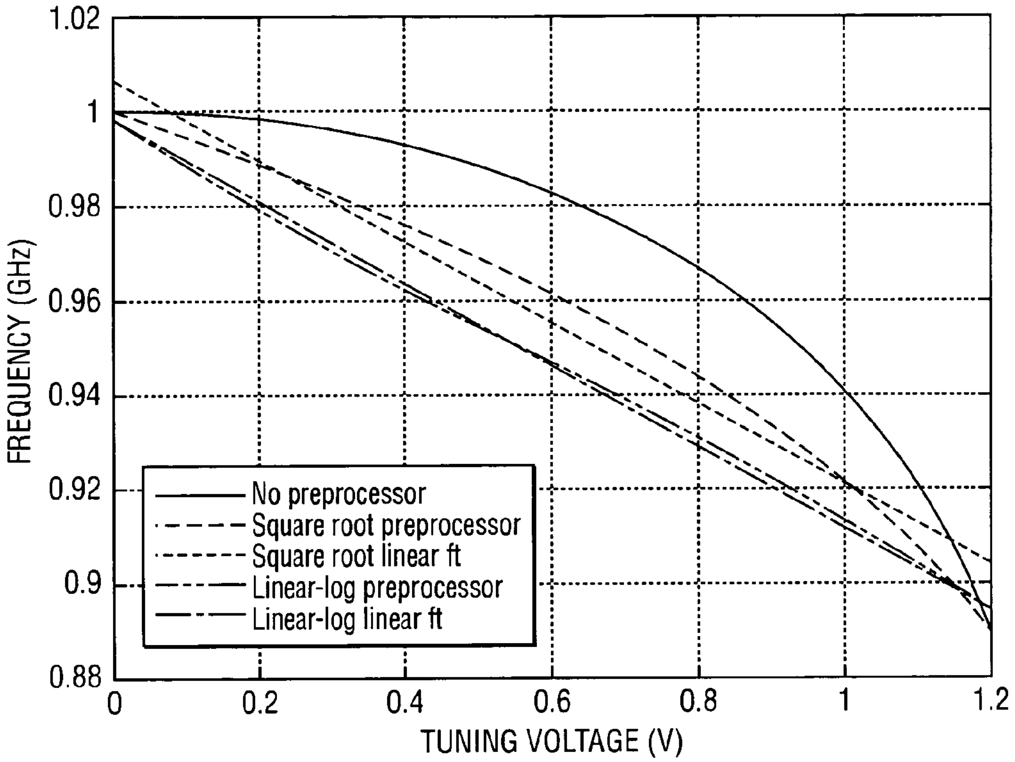
FIG. 4 is a graphical diagram illustrating frequency responses with an input tuning voltage without preprocessing, and with a tuning voltage having preprocessing in accordance with the present invention.

The nonlinear relationship between frequency and tuning voltage, with the linear relationship between displacement x and frequency, can be attributed to the displacement-voltage response illustrated in Equation 11, and illustrated in FIG. 4 (for a tuning voltage without the preprocessing of the present invention). As a consequence, the various embodiments of the present invention provide for preprocessing of an input signal, such as an input voltage, to create an applied or preprocessed voltage which will provide a linear response, i.e., a frequency response which varies linearly with the input signal (input voltage). Significant in the present invention, the derived applied voltage may be considered to be a nonlinearly "pre-distorted" voltage, accounting for the nonlinear frequency-voltage relationship in advance, such that a linear relationship is created between the frequency response and the original input voltage.

Four key metrics were considered while deriving an approach in order to linearize the displacement-voltage characteristic. First, the circuit should perform sufficiently accurate linearization of the response. Second, the function realized by the circuit should be reasonably straightforward to implement with analog electronics. Third, the circuit should consume a comparatively minimal amount of power. Last, the response time of the circuit should be sufficient to drive the varactor top plate 105.

The response of $V_{DC}$ can be linearized in x exactly by applying the same function in x to $V_{DC}$. Upon examination of Equation 11, it is clear that this function is of the form (Equation 12):

$$V_P=\sqrt{\alpha V_{DC}(V_o-V_{DC})^2}$$

where $V_p$ is the preprocessed (applied) tuning voltage (i.e., processed from input voltage $V_{DC}$), and $\alpha$ and $V_o$ are constants. This function is quite difficult to realize with CMOS electronics.

In accordance with the present invention, a preprocessed voltage is derived by noting that for small x relative to $x_o$, $V_{DC}$ can be approximated by the following (Equation 13):

$$V_{DC}\approx\sqrt{\frac{2k_m x x_o^2}{\varepsilon A}}$$

Hence, if the input tuning voltage is preprocessed (to form an applied voltage) by applying a square root function (i.e., $V_p=V_{DC}^{1/2}$), the relationship between the input tuning voltage and x would be then be nearly linear for small x. This first embodiment in accordance with the present invention resulted in a correlation coefficient ($R^2$) of 0.9870 between the achieved response and the least squares linear fit to the function (these results are illustrated in FIG. 4 as the "square root preprocessor" curve).

More accurate linearization was achieved in accordance with a second embodiment of the present invention by expanding Equation 11 to show the relationship between $V_{DC}$ and x is (Equation 14):

$$V_{DC}=\sqrt{\frac{2k_m}{\varepsilon A}}\left(\sqrt{x}\,x_o-x^{\frac{3}{2}}\right)=a\sqrt{x}-bx^{\frac{3}{2}}$$

where a and b are constants. Although a square-root function is capable of being implemented with CMOS electronics, it is quite difficult to realize a 3/2 power function. In accordance with the present invention, it was determined empirically that Equation 14 can be well approximated, utilizing a logarithmic function instead of the 3/2 power function, by the following (Equation 15):

$$a\sqrt{x}-bx^{\frac{3}{2}}\approx c\sqrt{x}+d\ln\left(\frac{x}{e}\right)$$

where x is greater than 1 and a, b, c, d, and e are constants selected such that the fit is accurate. The preprocessed, applied voltage is then of the form (Equation 16):

$$V_P=c\sqrt{V_{DC}}+d\ln\left(\frac{V_{DC}}{e}\right)$$

where c, d, and e were chosen to provide an accurate fit. In accordance with the present invention, the natural logarithm as an approximation to the 3/2 power function is implemented with weak inversion CMOS electronics, described below. This second linearization approach resulted in a response with an $R^2$ value of 0.9988 as compared to the least squares fit, and is illustrated as the "linear-log" curve of FIG. 4. The various embodiments of the present invention are illustrated and discussed with respect to FIGS. 5 and 6.

While not separately derived for the junction varactor of FIG. 3, the capacitance across the junction can be similarly estimated by assuming that the junction is abrupt and possesses uniform doping on each side. Under these assumptions, also in accordance with the present invention, the junction capacitance is given by (Equation 17):

$$C=\varepsilon A\left[\frac{q}{2\varepsilon(V_o-V)}\left(\frac{N_A N_D}{N_A+N_D}\right)\right]^{-\frac{1}{2}}$$

where $\epsilon$ is the permittivity of silicon (or other substrate), A is the cross-sectional area of the junction, q is the magnitude of the charge on one electron, $V_o$ is the built-in potential, V is the applied bias, $N_A$ is the density of acceptors in the p-type region, and $N_D$ is the density of donors in the n-type region. Equation 17 illustrates that the realized capacitance is nonlinear with the applied voltage. In addition, when the junction is doped asymmetrically (as illustrated in FIG. 3), Equation 17 may be reduced to the following (Equation 18):

$$C=\frac{A}{2}\left[\frac{2q\varepsilon}{V_o-V}N_D\right]^{\frac{1}{2}}$$

As a consequence, in accordance with the present invention, a substantially linear relationship is created between an input signal, such as an input voltage, and one or more selected or predetermined parameters, such as frequency or capacitance, through the use of a preprocessed voltage. More specifically, the input voltage is preprocessed to create an applied voltage which is provided to a selected device, such as device 100. As a result, the selected parameter has a substantially linear relationship with the original input signal, such that the input signal may be utilized directly as a linear control signal to determine a desired value of the parameter, such as a tuning frequency or capacitance.

Figure 5:
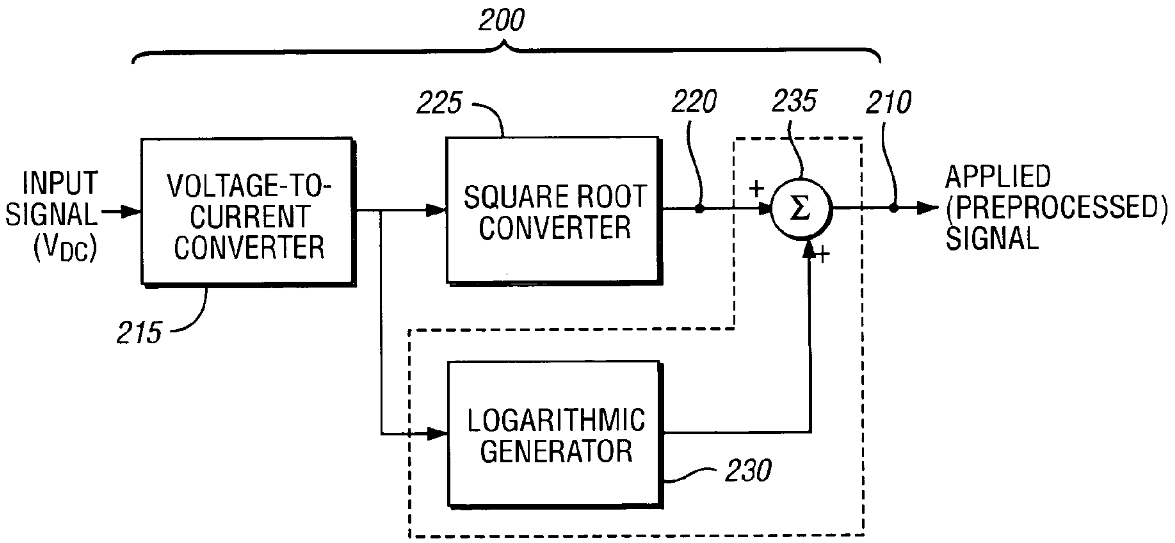
FIG. 5 is a block diagram illustrating exemplary embodiments of a linearizing apparatus in accordance with the present invention.

FIG. 5 is a block diagram illustrating exemplary embodiments of a linearizing apparatus 200 in accordance with the present invention. The apparatus 200 provides a substantially linear relationship between an input voltage, $V_{DC}$, and a predetermined parameter, such as frequency or capacitance of, for example, a parallel plate capacitor or a junction varactor. As illustrated in FIG. 5, the apparatus 200 comprises a voltage-to-current converter 215, a square root converter 225, a logarithmic generator 230, and a combiner (or summer) 235. In selected embodiments (such as that illustrated in FIG. 6), the combiner 235 is included within logarithmic generator 230.

Referring to FIG. 5, the voltage-to-current converter 215 is couplable to receive the input voltage, $V_{DC}$, and provides or generates an input current substantially linearly proportional to the input voltage. Depending upon the selected embodiment, the voltage-to-current converter 215 may be omitted, when the input voltage may be applied directly to the square root converter 225 and logarithmic generator 230. In addition, also in selected embodiments (such as that illustrated in FIG. 6), a current mirror may be utilized to provide the input current generated by the voltage-to-current converter 215 to the square root converter 225 and to the logarithmic generator 230. (In the embodiments of FIG. 5, the square root converter 225 is coupled directly to the voltage-to-current converter 215 to receive the input current; in the embodiments illustrated in FIG. 6, the square root converter 225 is indirectly coupled to the voltage-to-current converter 215 through a current mirror circuit 340.)

The square root converter 225 is capable of providing a square root voltage, as a first output voltage (on node 220) substantially proportional to a square root of a magnitude of the input current or, equivalently, substantially proportional to a square root of a magnitude of the input voltage. The square root voltage is considered substantially proportional to, rather than substantially equal to, the square root of the magnitude of the input current, because the square root voltage may also be scaled or amplified in various embodiments within the scope of the present invention. This first output voltage may be utilized directly by selected embodiments utilizing only square root preprocessing, such as the junction varactor (Equations 17 and 18), or for parallel plate capacitors when the approximation of Equation 13 is sufficient for a selected application.

The logarithmic generator 230 also receives the input current, and provides a logarithmic voltage substantially proportional to a logarithm of the magnitude of the input current or, equivalently, substantially proportional to a logarithm of the magnitude of the input voltage. Again, the logarithmic voltage is considered substantially proportional to, rather than substantially equal to, the logarithm of the magnitude of the input current, because the logarithmic voltage may also be scaled or amplified in various embodiments within the scope of the present invention, such as in the embodiments of FIG. 6. In the various embodiments, the logarithmic generator 230 may additionally have the combining or summing function of combiner 235, such that the logarithmic generator 230 is capable of providing a second output voltage (as an applied, preprocessed signal or voltage on node 210) substantially proportional to a sum of the logarithm of the magnitude of the input current (input voltage) plus the square root of the magnitude of the input current (input voltage) (from square root converter 225). As discussed above, this second output voltage has a substantially nonlinear relation to the predetermined parameter (i.e., the second output voltage is pre-distorted so that, when applied to a circuit having the predetermined parameter, the predetermined parameter will vary substantially linearly with the input voltage).

Figure 6:
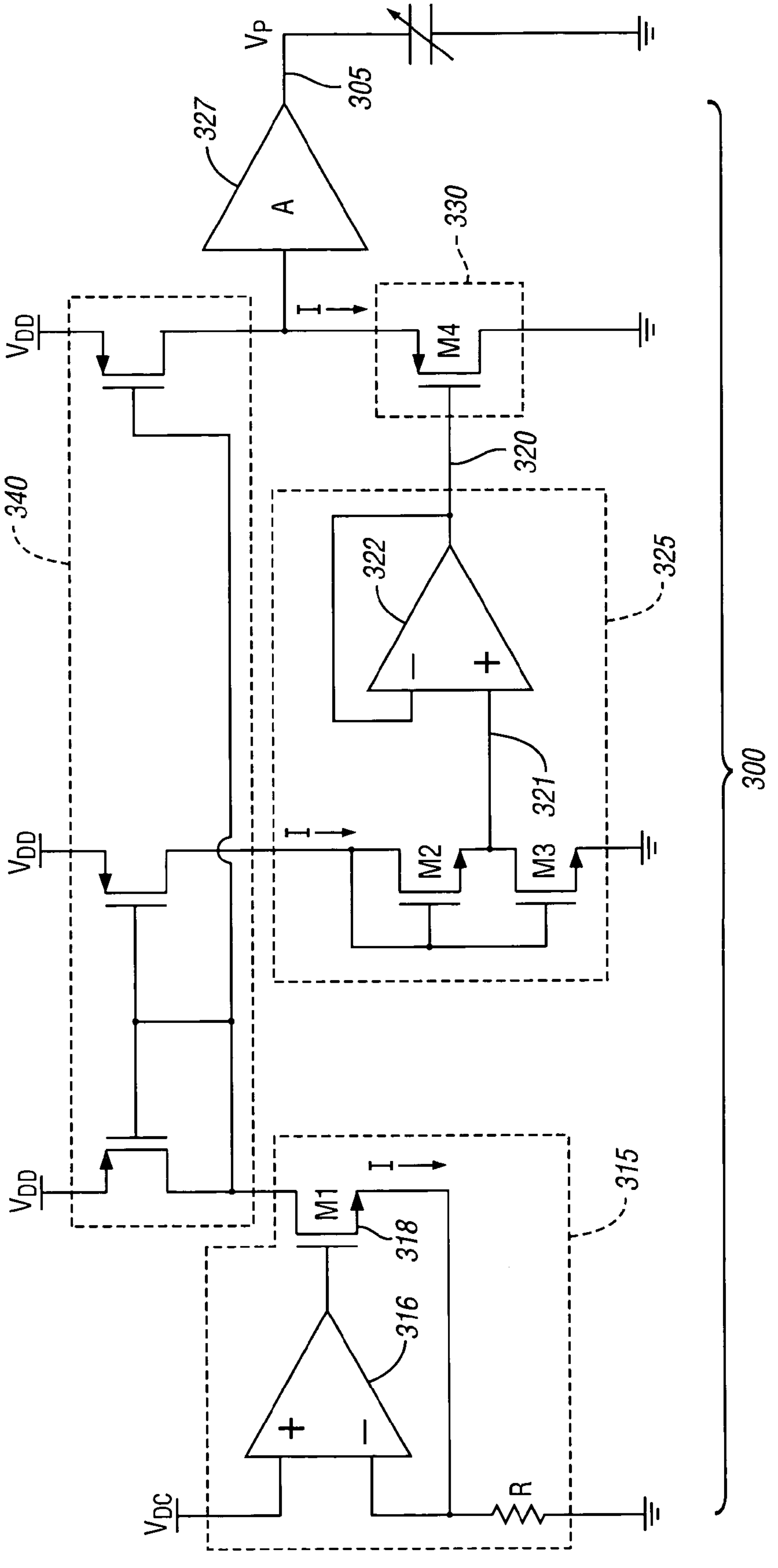
FIG. 6 is a circuit diagram illustrating exemplary embodiments of a linearizing apparatus in accordance with the present invention.

FIG. 6 is a circuit diagram illustrating exemplary embodiments of a linearizing apparatus 300 in accordance with the present invention. The linearizing apparatus 300 ultimately realizes an applied, processed voltage (on node 305) substantially equal (i.e., substantially proportional) to the sum of the square root of the input voltage and its natural log. This is accomplished by first generating a current that is a linear function of the applied voltage, by voltage-to-current converter 315, implemented using an operational amplifier arrangement for voltage to current conversion [9], comprising operational amplifier 316 and transistor 318 (n-channel MOSFET M1). The realized transfer is $I=V_{DC}/R$. The headroom for this circuit is limited by the minimum voltage required to keep transistor M1 on and by the magnitude of the current generated, as the output of the operational amplifier 316 will rail to $V_{DD}$ if the $V_{GS}$ required in order to maintain the current in M1 is too large. In this application, a small current is generated in order to minimize power consumption and thus the circuit is limited by $V_{GS}$ of M1. The maximum input voltage is then $V_{max}=V_{DD}-V_{th}$, where $V_{th}$ is the threshold voltage of M1. The current I, referred to as the input current, is provided to other components of the apparatus 300 utilizing current mirror 340, as mentioned above.

A square root converter 325 is implemented using a nested pair transistor arrangement (M2 and M3), providing a square root of current to voltage transformation, i.e., providing an output voltage on node 321 substantially proportional to a square root of the current I. As illustrated, the gates of n-channel transistors M2 and M3 are coupled to receive the (input) current I, and the source of M2 is coupled to the drain of M3. In operation, M3 will be forced into saturation while M2 is forced into the linear region of operation [8]. It can be shown that if M2 and M3 are matched, the realized transfer is given by (Equation 19):

$$V = \left(2 - \sqrt{2}\right)\sqrt{\frac{I}{k}} = \left(2 - \sqrt{2}\right)\sqrt{\frac{V_{DC}}{Rk}}$$

where k=μnCox(W/L). Device geometries are chosen to realize the appropriate voltage. A small offset exists if body effect is considered. The square root voltage is then buffered (by operational amplifier 322), and provided on node 320.

A logarithmic generator 330 is implemented using a p-channel MOSFET (transistor M4). The square root voltage is then level shifted through this PMOS device that is forced into weak inversion. The current in M4 is also controlled by the linear voltage-to-current generator 315. In weak inversion and forward saturation the drain current [7], I, of the device is given by (Equation 20):

$$I=I_{DO}e^{(V_G-nV_S)/nV_T}$$

where $V_G$ is the gate voltage, n is the slope factor, $V_S$ is the source voltage, $V_T$ is the thermal voltage, and $I_{DO}$ is the characteristic current given by (Equation 21):

$$I_{DO}=I_S e^{-V_{th}/nV_T}$$

where $V_{th}$ is the threshold voltage, and $I_S=2n\mu C_{ox}W/LV_T$, W/L is the device aspect ratio, μ is the mobility, and $C_{ox}$ is the gate oxide capacitance. For n near 1, Equation 20 can be approximated as (Equation 22):

$$I \approx I_{DO} e^{V_{GS}/nV_T}$$

which can be solved to show that (Equation 23):

$$V_{GS}-nV_T \ln(I/I_{DO})=nV_T \ln(V_{DC}/RI_{DO}).$$

As a consequence, the logarithmic generator 330 provides an output signal substantially proportional to the (natural) logarithm of the input signal (input voltage $V_{DC}$) and, in this implementation, also combines or adds the logarithmic voltage to the square root voltage on node 320.

Finally, the signal is amplified by the DC transfer of a low bandwidth feedback amplifier 327 with gain A. The output of the amplifier has high impedance to avoid providing a low impedance AC path to ground from the top plate of the varactor. The realized processed voltage on node 305, Vp, is thus (Equation 24):

$$V_p = A\left[(2-\sqrt{2})\sqrt{\frac{V_{DC}}{Rk}} + nV_T \ln\left(\frac{V_{DC}}{RI_{DO}}\right)\right]$$

or in the desired form of (Equation 25):

$$V_p = f\sqrt{V_{DC}} + g\ln\left(\frac{V_{DC}}{h}\right)$$

where (Equations 26–28):

$$f = A(2-\sqrt{2})\sqrt{\frac{1}{Rk}}$$

$$g=AnV_T$$

$$h=RI_{DO}$$

Device geometries and parameters are selected based upon the application and the dynamic range of the tuning voltage.

Figure 7A:
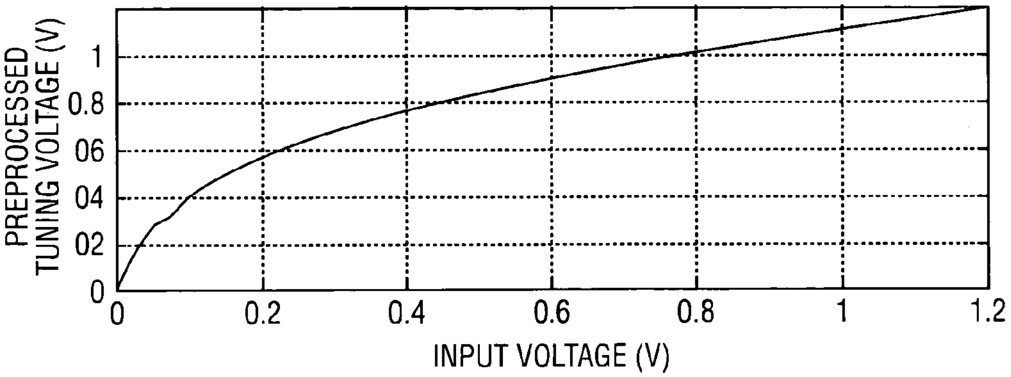
FIG. 7 is a graphical diagram illustrating applied (preprocessed) voltage output and corresponding frequency response as a function of input voltage in accordance with the present invention.
Figure 7B:
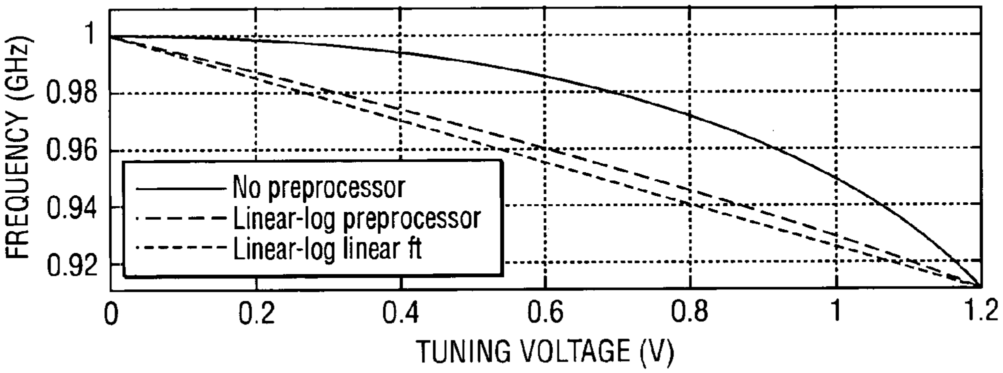

The apparatus 300 was designed in the 0.18 μm mixed-mode process available from Taiwan Semiconductor Manufacturing Company (TSMC). A summary of the relevant parameters is given in Table I. The DC transfer characteristic for the realized circuit it shown in FIG. 7 as is the associated frequency response for this preprocessed, applied voltage. The achieved performance includes a correlation coefficient ($R^2$) of 0.9988 as compared to the least squares linear fit of the response and matches the theoretical performance. The response time of the circuit was also determined for both negative and positive pulses that span full scale as shown in FIG. 7. The negative pulse response time is slow due to the significant charge stored on the varactor, but does not adversely affect the frequency tuning. The circuit also shuts off at 0VDC input and thus the charge must be bled through the high impedence of the output amplifier. Additional embodiments (not illustrated) of the apparatus 300 could include switches for bleeding the excess charge off of the varactor when the input signal approaches 0VDC.

TABLE 1

Exemplary Linearizing Apparatus Parameters

| Parameter: | Value: |
|---|---|
| Technology | TSMC 0.18 μm |
| Devices (including bias) | 25 |
| Supply Voltage | 2 V |
| Power min/max | 7 μW/100 μW |
| +/− Response Time (1 pF load) | 50 μs/700 μs |
| Input min/max | 1.2 V/0 V |
| Output min/max | 1.2 V/0 V |
| Linear Frequency Response (R2) | 0.9988 |

Figure 8:
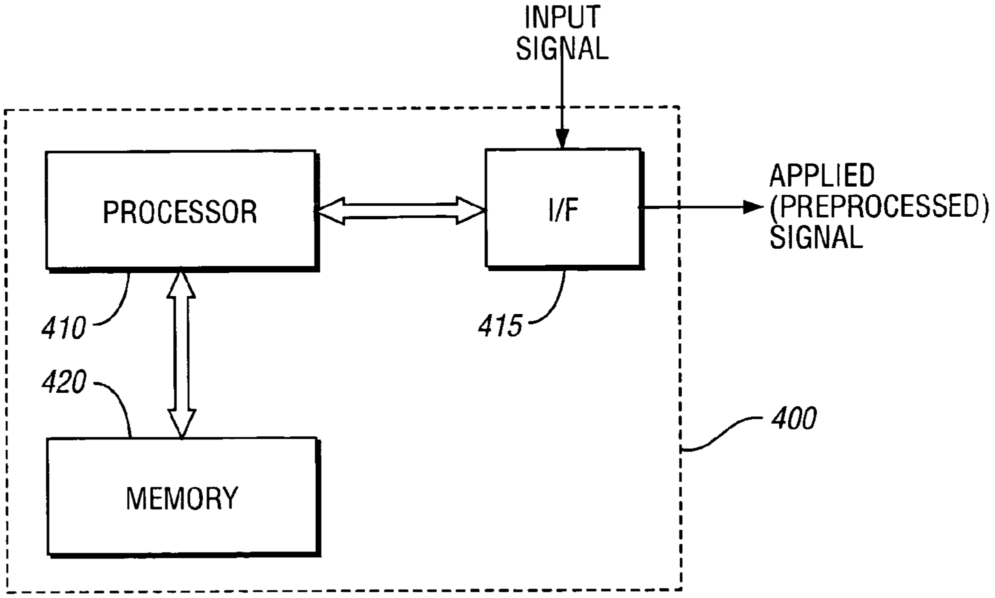
FIG. 8 is a block diagram illustrating an exemplary processor-based embodiment of a linearizing apparatus in accordance with the present invention.

FIG. 8 is a block diagram illustrating an exemplary processor-based embodiment of a linearizing apparatus 400 in accordance with the present invention. The apparatus 400 includes an interface 415, a processor 410, and a memory 420. The interface 415 is utilized for digital-to-analog (D/A) and analog-to-digital (A/D) conversion, and to otherwise receive and transmit information and other data, such as voltage control signals, and is typically designed to interface with a channel for communication or connectivity with, for example, a VCO (not separately illustrated). More particularly, the interface 415 is adapted to convert an input voltage level (as a control signal) to a digital form for use by processor 410, and to convert a digital signal from processor 410 to an analog form, such as an applied voltage level, for application to a VCO.

The apparatus 400 also includes a processor 410 and a memory 420. The memory 420 is preferably an integrated circuit (such as RAM, DRAM, SRAM, SDRAM, MRAM, ROM, FLASH, EPROM, $E^2$PROM, or any of other various forms of memory currently known or which may become available), but also may be a magnetic hard drive, an optical storage device, or any other type of data storage apparatus. The memory 420 is used to store information obtained during the linearizing process, as discussed below, and also may store information pertaining to program instructions or configurations, if any (discussed below). Also as discussed in greater detail below, the processor 410 receives a bit stream (representative of one or more input voltage levels) from the interface 415, and produces a digital bit stream or word, representative of one or more applied voltage levels in accordance with the present invention.

Continuing to refer to FIG. 8, the processor 410 may include a single integrated circuit ("IC"), or may include a plurality of integrated circuits or other components connected, arranged or grouped together, such as microprocessors, coprocessors, digital signal processors ("DSPs"), controllers, microcontrollers, custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above and also discussed in detail below with reference to FIG. 9, with associated memory, such as microprocessor memory or additional RAM, DRAM, SRAM, MRAM, ROM, EPROM or $E^2$PROM. The processor 410 with its associated memory may be adapted or configured (via programming or hardwiring) to perform the methodology of the invention, as discussed above and as discussed below with reference to FIG. 9. For example, the methodology may be programmed and stored, in the processor 410 with its associated memory (and/or memory 420) and other equivalent components, as a set of program instructions (or equivalent configuration or other program) for subsequent execution when the processor 410 is operative (i.e., powered on and functioning), thereby adapting the processor 410 for performance of the linearization of the present invention. Equivalently, when the processor 410 with its associated memory and other equivalent components are implemented in whole or part as FPGAs, custom ICs and/or ASICs, the FPGAs, custom ICs or ASICs also may be designed, configured and/or hardwired to implement the methodology of the invention. In addition, the processor 410 (and/or apparatus 400) may be part of or included within a larger system, such as within a computer, within a workstation, within a computer network, within an adaptive computing device, or within any other form of computing or other system which utilizes or requires a linearizing operation, such as a system which includes a voltage controlled oscillator.

For example, an exemplary apparatus in accordance with the present invention includes an interface 415 to convert an analog input signal to a digital input signal and to convert a digital applied signal to an analog applied signal, wherein the interface is further adapted to provide the analog applied signal for adjustment of a selected parameter substantially linearly with the analog input signal; and a processor 410 coupled to the interface 415, the processor adapted to determine a square root of a magnitude of the digital input signal to form a square root signal; to determine a logarithm of the magnitude of the input signal to form a logarithmic signal; and the processor further adapted to combine the square root signal with the logarithmic signal to form the digital applied signal.

As another exemplary apparatus, the present invention includes processor 410 adapted to process a tuning signal to form a processed signal and to provide the processed signal to control a displacement of a plate (e.g., 105) of a micromachined varactor (e.g., 100) as a substantially linear function of the tuning signal. The processor 410 may be further adapted to process the tuning signal by determining a square root of a magnitude of the input signal to form a square root signal, determining a logarithm of the magnitude of the input signal to form a logarithmic signal, and combining the square root signal with the logarithmic signal to form the processed signal. Alternatively, the processor 410 may be further adapted to process the tuning signal by determining a square root of a magnitude of the input signal to form a square root signal, determining a $3/2$ power of the magnitude of the input signal to form a power signal, and combining the square root signal with the power signal to form the processed signal.

Figure 9:
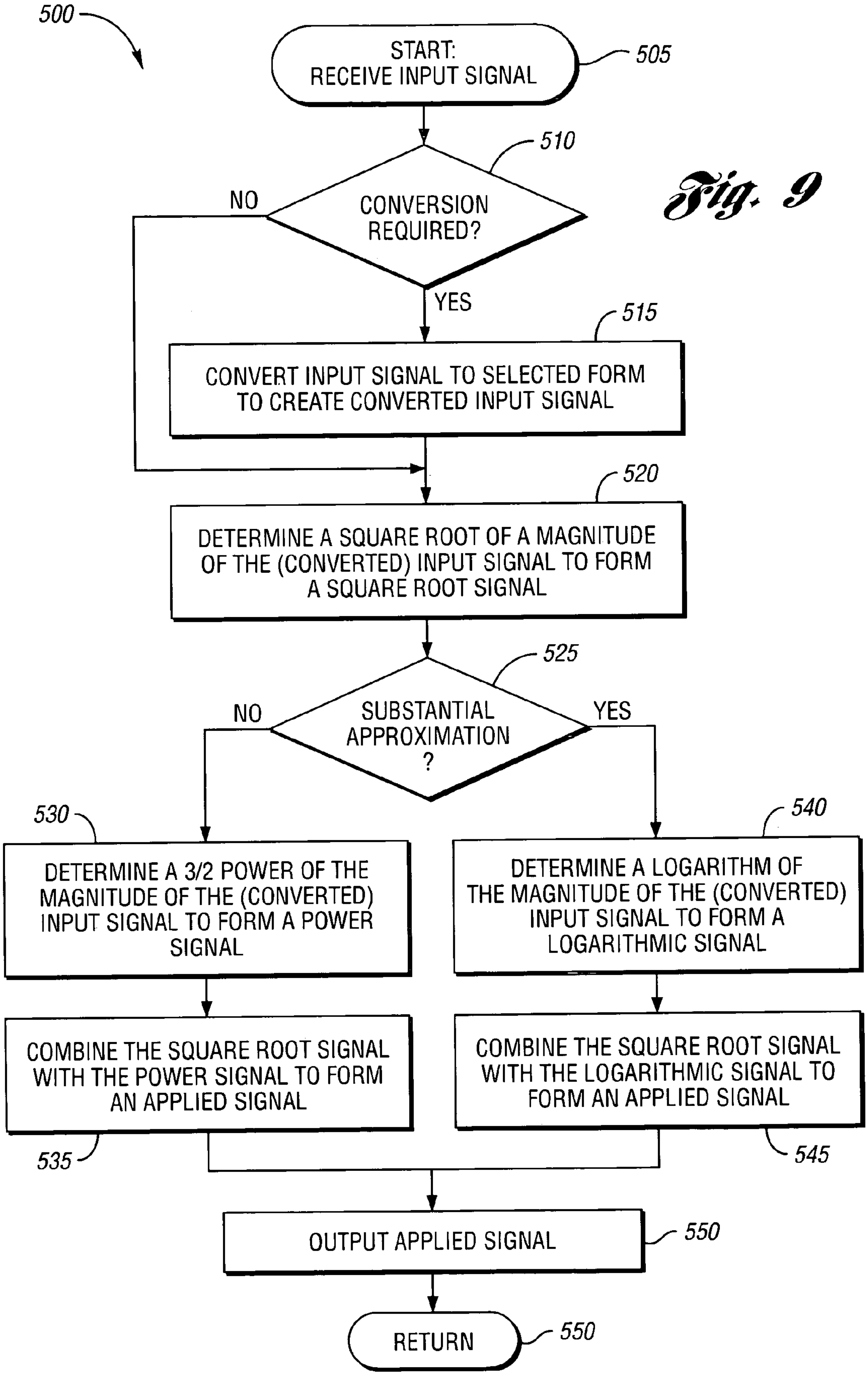
FIG. 9 is a flow chart illustrating an exemplary linearizing method embodiment in accordance with the present invention.

FIG. 9 is a flow chart illustrating an exemplary linearizing method embodiment 500 in accordance with the present invention. As indicated above, this methodology may be performed by a processor 410, by the apparatuses 200 or 300, or by any other similarly or equivalently configured circuitry. The method may also be characterized as a method of pre-distorting a control signal to create an applied signal having a nonlinear relationship with a parameter (such as a circuit parameter) such that the control signal has a linear relationship with the parameter.

The method begins, start step 505, with reception of an input signal, such as an input voltage or input current. As mentioned above, depending upon the selected embodiment, conversion of the input signal may be necessary of desirable, such as conversion of an input voltage to an input current, or conversion of an analog input signal to a digital form, step 510. When such conversion is appropriate in step 510, the method proceeds to step 510 and performs the corresponding conversion to a selected form (e.g., current, digital representation), to form a converted input signal, step 515. When no such conversion is appropriate in step 510, the method proceeds directly to step 520.

In step 520, the method determines a square root of a magnitude of the (converted) input signal, to form a square root signal. (As mentioned above, depending upon the selected embodiment, the square root signal may be provided as the applied signal and, if so, the method may proceed to step 540, and output the square root signal as the applied signal.) Following step 520 in the more general case, the method then determines an appropriate level of approximation in step 525, proceeding to step 530 for a comparatively more exact solution, or proceeding to step 540 for a comparatively less exact (or substantially approximate) solution. In step 530, for a comparatively more exact linearization, the method determines a $3/2$ power of the magnitude of the input signal, to form a power signal. The method then combines (e.g., sums or performs a superposition of) the square root signal with the power signal to form an applied signal, step 535.

When a substantially approximate (or less exact) linearization is appropriate, in step 540, the method determines a (natural) logarithm of the magnitude of the input signal, to form a logarithmic signal. The method then combines (e.g., sums or performs a superposition of) the square root signal with the logarithmic signal to form the applied signal, step 545. The method then provides or outputs the applied signal (and may also convert the applied signal from a digital to analog form, e.g., for apparatus 400), step 550, and the method may end, return step 555.

In summary, the methodology of the present invention may be characterized as providing a substantially linear relationship between an input voltage and a predetermined circuit parameter. The method comprises: first, converting the input voltage to an input current, wherein the input current is substantially linearly proportional to the input voltage; second, generating a square root voltage from the input current, wherein the square root voltage is substantially proportional to a square root of a magnitude of the input current; third, generating a logarithmic voltage from the input current, wherein the logarithmic voltage is substantially proportional to a logarithm of the magnitude of the input current, and wherein the logarithmic voltage is substantially equal to a $3/2$ power of the input current; and fourth, combining the square root voltage and the logarithmic voltage to form an applied signal substantially equal to a sum of the square root voltage and the logarithmic voltage, wherein the applied signal has a substantially nonlinear relationship to the predetermined parameter. Finally, the method may also include applying the applied signal to vary the predetermined circuit parameter substantially linearly with the input voltage.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An apparatus to provide a substantially linear relationship between an input signal and a selected parameter, the apparatus comprising:

a square root converter capable of being coupled to receive the input signal, the square root converter adapted to provide a square root signal, the square root signal substantially proportional to a square root of the input signal; and circuitry comprising a logarithmic generator couplable to receive the input signal and coupled to the square root converter, the logarithmic generator adapted to provide an applied signal for substantially linear control of the selected parameter in response to the input signal, the applied signal substantially proportional to a sum or superposition of the square root signal and a logarithm of the input signal.

2. The apparatus of claim 1, further comprising:

a voltage-to-current converter coupled to the square root converter and to the logarithmic generator, the voltage-to-current converter capable of being coupled to receive an input voltage and adapted to provide the input signal as an input current having a substantially linear relationship to the input voltage.

3. The apparatus of claim 2, wherein the voltage-to-current converter further comprises:

an operational amplifier having a first input coupled to receive the input voltage; and a n-channel transistor coupled to an output and to a second input of the operational amplifier, the n-channel transistor adapted to provide the input current.

4. The apparatus of claim 1, wherein the logarithm of the input signal is provided by the logarithmic generator as substantially equivalent to a 3/2 power of the input signal.

5. The apparatus of claim 2, further comprising:

a current mirror coupled to the voltage-to-current converter, to the square root converter and to the logarithmic generator, the current mirror adapted to provide the input current from the voltage-to-current converter to the square root converter and the logarithmic generator.

6. The apparatus of claim 1, further comprising:

an amplifier coupled to the logarithmic generator to provide an amplified applied signal.

7. The apparatus of claim 1, wherein the applied signal has a non-linear relationship to the selected parameter.

8. The apparatus of claim 1, wherein the input signal is an input voltage or an input current linearly converted from the input voltage.

9. The apparatus of claim 1, wherein the selected parameter is a frequency response.

10. The apparatus of claim 1, further comprising:

a parallel plate capacitor coupled to receive the applied signal, wherein the selected parameter is a frequency response of the parallel plate capacitor, and wherein the frequency response varies substantially linearly with the input signal and substantially nonlinearly with the applied signal.

11. The apparatus of claim 1, further comprising:

a varactor coupled to receive the applied signal, wherein the selected parameter is a frequency response of the varactor, and wherein the frequency response varies substantially linearly with the input signal and substantially nonlinearly with the applied signal.

12. The apparatus of claim 11, wherein the varactor is a CMOS-compatible MEMS varactor.

13. The apparatus of claim 1, wherein the selected parameter is a capacitance.

14. The apparatus of claim 1, wherein the square root converter is coupled through a buffer to the logarithmic generator.

15. The apparatus of claim 1, wherein the square root converter further comprises a first n-channel MOSFET transistor and a second n-channel MOSFET transistor having a nested-pair configuration and having coupled gates to receive the input signal.

16. The apparatus of claim 1, wherein the square root converter further comprises:

a first transistor having a first gate, a first drain and a first source;

a second transistor having a second gate, a second drain and a second source, the first gate coupled to the second gate to receive the input signal, the second drain coupled to the first source to provide the square root signal.

17. The apparatus of claim 1, wherein the logarithmic generator further comprises a transistor having a gate to receive the square root signal and having a source couplable to receive the input signal.

18. The apparatus of claim 17, wherein the transistor is a p-channel transistor adapted to operate in a weak inversion state.

19. The apparatus of claim 1, wherein the applied signal is a voltage level $V_p$, wherein the voltage level $$V_p = c\sqrt{V_{DC}} + d\ln\left(\frac{V_{DC}}{e}\right),$$

wherein $V_{DC}$ is an input voltage level provided as the input signal, and wherein c, d, and e are predetermined constants.

20. The apparatus of claim 1, further comprising:

an oscillator coupled to receive the applied signal, wherein an oscillation frequency of the oscillator is the selected parameter and is substantially linearly tunable in response to the applied signal.

21. The apparatus of claim 1, wherein the input signal is a digital signal and wherein the square root converter and circuitry comprising a logarithmic generator are embodied as a processor.

22. A circuit to provide a substantially linear relationship between an input voltage and a frequency response of a capacitor, the circuit comprising:

a voltage-to-current converter, the voltage-to-current converter capable of being coupled to receive the input voltage, the voltage-to-current converter capable of providing an input current substantially linearly proportional to the input voltage;

a current mirror coupled to the voltage-to-current converter;

a square root converter coupled to the current mirror to receive the input current, the square root converter capable of providing a first output voltage substantially proportional to a square root of a magnitude of the input current; and circuitry comprising a logarithmic generator coupled to the square root converter to receive the first output voltage and coupled to the current mirror to receive the input current, the circuitry adapted to provide a second output voltage substantially proportional to a sum or superposition of the first output voltage and a logarithm of the magnitude of the input current, the second output voltage capable of being coupled to the capacitor for a substantially linear frequency response to the input signal.

23. The circuit of claim 22, further comprising:

a junction varactor coupled to receive the first output voltage, wherein a capacitance of the junction varactor varies substantially linearly with the input voltage to provide a linear frequency response.

24. The circuit of claim 22, wherein the capacitor is a parallel plate capacitor coupled to the circuitry to receive the second output voltage.

25. The circuit of claim 22, wherein the capacitor is a CMOS-compatible varactor coupled to the circuitry to receive the second output voltage.

26. An apparatus to provide a substantially linear relationship between an input voltage and a predetermined circuit parameter, the apparatus comprising:

a voltage-to-current converter, the voltage-to-current converter capable of being coupled to receive the input voltage, the voltage-to-current converter capable of providing an input current substantially linearly proportional to the input voltage;

a current mirror coupled to the voltage-to-current converter;

a square root converter coupled to the current mirror to receive the input current, the square root converter capable of providing a first output voltage substantially proportional to a square root of a magnitude of the input current;

a logarithmic generator coupled to the current mirror to receive the input current, the logarithmic generator capable of providing a second output voltage substantially proportional to a logarithm of the magnitude of the input current; and a combiner coupled to the square root converter to receive the first output voltage and coupled to the logarithmic generator to receive the second output voltage, the combiner adapted to provide an applied signal substantially equal to a sum or superposition of the first output voltage and the second output voltage, wherein the applied signal has a substantially nonlinear relationship to the predetermined parameter.

27. A method of providing a substantially linear relationship between an input voltage and a predetermined circuit parameter, the method comprising:

converting the input voltage to an input current, wherein the input current is substantially linearly proportional to the input voltage;

generating a square root voltage from the input current, wherein the square root voltage is substantially proportional to a square root of a magnitude of the input current;

generating a logarithmic voltage from the input current, wherein the logarithmic voltage is substantially proportional to a logarithm of the magnitude of the input current, and wherein the logarithmic voltage is substantially equal to a $3/2$ power of the input current; and combining the square root voltage and the logarithmic voltage to form an applied signal substantially equal to a sum or superposition of the square root voltage and the logarithmic voltage, wherein the applied signal has a substantially nonlinear relationship to the predetermined parameter; and applying the applied signal to vary the predetermined circuit parameter substantially linearly with the input voltage.

28. A method to create a substantially linear relationship between an input signal and a selected parameter, comprising:

(a) receiving the input signal;

(b) determining a square root of a magnitude of the input signal to form a square root signal;

(c) determining a logarithm of the magnitude of the input signal to form a logarithmic signal;

(d) combining the square root signal with the logarithmic signal to form an applied signal, the applied signal having a substantially nonlinear relationship to the input signal; and (e) providing the applied signal for adjustment of the selected parameter substantially linearly with the input signal.

29. The method of claim 28, wherein the logarithm of the magnitude of the input signal is provided as a substantial approximation to a $3/2$ power of the magnitude of the input signal.

30. A method to create a substantially linear relationship between an input signal and a selected parameter, comprising:

(a) receiving the input signal;

(b) determining a square root of a magnitude of the input signal to form a square root signal;

(c) determining a $3/2$ power of the magnitude of the input signal to form a power signal;

(d) combining the square root signal with the power signal to form an applied signal, the applied signal having a substantially nonlinear relationship to the input signal; and (e) providing the applied signal for adjustment of the selected parameter substantially linearly with the input signal.

31. An apparatus to provide a substantially linear relationship between an input signal and a selected parameter, the apparatus comprising:

a voltage-to-current converter couplable to receive the input signal as an input voltage and adapted to provide an input current having a substantially linear relationship to the input voltage;

a square root converter coupled to the voltage-to-current converter to receive the input current, the square root converter adapted to provide a square root signal, the square root signal substantially proportional to a square root of the input current; and circuitry comprising a logarithmic generator coupled to the voltage-to-current converter to receive the input current and coupled to the square root converter, the circuitry adapted to provide an applied signal substantially proportional to a sum or a superposition of the square root signal and a logarithm of the input signal.

* * * * *

UNITED STATES PATENT AND TRADEMARK OFFICE

CERTIFICATE OF CORRECTION

PATENT NO. : 7,132,874 B2
APPLICATION NO. : 10/829575
DATED : November 7, 2006
INVENTOR(S) : McCorquodale et al.

It is certified that error appears in the above-identified patent and that said Letters Patent is hereby corrected as shown below:

<u>In the Patent:</u>

Column 1, Line 20; Please insert the following language before BACKGROUND OF THE INVENTION:

--GOVERNMENT FUNDING

This invention was made with Government support under NSF Grant (EEC) 9986866 awarded by the National Science Foundation. The Government has certain rights in this invention.--

Signed and Sealed this
Ninth Day of October, 2012

David J. Kappos
*Director of the United States Patent and Trademark Office*